United States Patent [19]

Pelin et al.

[11] Patent Number: 5,937,014
[45] Date of Patent: Aug. 10, 1999

[54] SELF-SYNCHRONIZING EQUALIZATION TECHNIQUES AND SYSTEMS

[75] Inventors: Per Pelin, Göteborg; Sören Anderson, Stockholm, both of Sweden

[73] Assignee: Telefonaktiebolaget LM Ericsson, Stockholm, Sweden

[21] Appl. No.: 08/827,169

[22] Filed: Mar. 27, 1997

[51] Int. Cl.⁶ .................................................. H03D 1/00
[52] U.S. Cl. ............................................ 375/340; 375/348
[58] Field of Search ................................. 375/340, 341, 375/346, 348, 262

[56] References Cited

U.S. PATENT DOCUMENTS

| 5,488,635 | 1/1996 | Chennakeshu et al. | 375/340 |
| 5,596,607 | 1/1997 | Larsson et al. | 375/340 |
| 5,862,192 | 1/1999 | Huszar et al. | 375/347 |

FOREIGN PATENT DOCUMENTS

| 563020 | 9/1993 | European Pat. Off. . |
| 642243 | 3/1995 | European Pat. Off. . |
| 654925 | 5/1995 | European Pat. Off. . |
| WO94/187 | 8/1994 | WIPO . |
| WO94/18752 | 8/1994 | WIPO . |

OTHER PUBLICATIONS

Partial International Search Report re PCT/SE98/00518 Date of completion of search: Sep. 1, 1998.
Liu et al., "An Adaptive Maximum–Likelihood Sequence Estimation Receiver With Dual Diversity Combining/Selection", PIMRC '92, *The Third IEEE International Symposium on Personal, Indoor and Mobile Radio Communications Proceedings*, pp. 245–249 (1992).
Khalaj B. H. et al., "Spatial–Temporal Channel Estimation Techniques for Multiple Access Spread Spectrum Systems with Antenna Arrays", ICC'95 Seattle. Communications— Gateway to Globalization, pp. 1520–1524 vol. 3.
European Standard Search Report (second search) re RS 99247 Date of completion of search: Oct. 30, 1997.
Wern–Ho Sheen et al., "MLSE Equalization and Decoding for Multipath–Fading Channels", *IEEE Trans. Commun.*, vol. 39, pp. 1455–1464 (Oct. 1991).
Q. Liu et al., "A Unified MLSE Detection Technique for TDMA Digital Cellular Radio", *43rd IEEE Vehicular Technology Conference*, Seacaucus, N.J., pp. 265–268 (May 18–20, 1993).
Per Pelin et al., "Iterative Least Squares Receiver Performance on Flat–Fading Vector Channels and RAKE–Extension for Time–Dispersive Channels", Publication / Dept. of Applied Electronics, six pages (Sep. 1996).
Per Pelin et al., "Decoupled Separation of Digitally Modulated Signals Arriving at an Antenna Array", Publication / Dept. of Applied Electronics, five pages (Jun. 1996).
European Standard Search Report re RS 99247 Date of completion of search: Sep. 3, 1997.

*Primary Examiner*—Amanda T. Le
*Attorney, Agent, or Firm*—Burns, Doane, Swecker & Mathis, L.L.P.

[57] ABSTRACT

Methods and systems for processing received radio signals are described wherein the finite alphabet quality of digital transmissions is utilized to improve performance. Nonsynchronous sampling of received signals introduces intersymbol interference which is compensated for by these methods and systems. Different types of signal modulation, and their impact on this type of intersymbol interference are discussed. A robust diversity combining technique, usable in conjunction with antenna arrays is developed.

10 Claims, 9 Drawing Sheets

SELF-SYNCHRONIZING EQUALIZATION TECHNIQUES AND SYSTEMS

BACKGROUND

In recent years, wireless communication systems have been used to convey a variety of information between multiple locations. With digital communications, information is translated into a digital or binary form, referred to as bits, for communications purposes. The transmitter maps this bit stream into a modulated symbol stream, which is detected at the digital receiver and mapped back into bits and information.

In digital wireless communications, the radio environment presents many difficulties that impede successful communications. One difficulty is that the signal level can fade, because the signal may travel in multiple paths. As a result, signal images arrive at the receiver antenna out of phase. This type of fading is commonly referred to as Rayleigh fading or fast fading. When the signal fades, the signal-to-noise ratio becomes lower, causing a degradation in the communication link quality.

A second problem occurs when the multiple signal paths are much different in length. In this case, time dispersion occurs in which multiple fading signal images arrive at the receiver antenna at different times, giving rise to signal echoes. This causes intersymbol interference (ISI), where the echoes of one symbol interfere with subsequent symbols.

Raleigh fading can be mitigated by using diversity, such as antenna diversity, at the receiver. The signal is received on a plurality of antennas. Because the antennas have slightly different locations and/or antenna patterns, the fading levels on the antennas are different. In the receiver, these multiple antenna signals are combined either before or after signal detection using such techniques as maximal-ratio-combining, equal-gain-combining, and selective combining. These techniques are well known to those skilled in the art and can be found in standard textbooks, such as W. C. Y. Lee, *Mobile Communications Engineering,* New York: McGraw-Hill, 1982.

The time dispersion can be mitigated by using an equalizer. Common forms of equalization are provided by linear equalizers, decision-feedback equalizers, and maximum-likelihood sequence-estimation (MLSE) equalizers. A linear equalizer tries to undo the effects of the channel by filtering the received signal. A decision-feedback equalizer exploits previous symbol detections to cancel out the intersymbol interference from echoes of these previous symbols. Finally, an MLSE equalizer hypothesizes various transmitted symbol sequences and, with a model of the dispersive channel, determines which hypothesis best fits the received data. These equalization techniques are well known to those skilled in the art, and can be found in standard textbooks such as J. G. Proakis, *Digital Communications,* 2nd ed. New York: McGraw-Hill, 1989.

Of the three common equalization techniques, MLSE equalization has been considered preferable from a performance point of view. In the MLSE equalizer, all possible transmitted symbol sequences are considered. For each hypothetical sequence, the received signal samples are predicted using a model of the multipath channel. The difference between the predicted received signal samples and the actual received signal samples, referred to as the prediction error, gives an indication of how good a particular hypothesis is. The squared magnitude of the prediction error is used as a metric to evaluate a particular hypothesis. This metric is accumulated for different hypotheses for use in determining which hypotheses are better. This process is efficiently realized using the Viterbi algorithm, which is a form of dynamic programming.

Ideally, the diversity combining process and the equalization process should be combined in some optimal way. Recent research has shown that for MLSE equalization, diversity combining should be done within the equalizer. This research can be found in W. H. Sheen and G. L. Stüber, "MLSE equalization and decoding for multipath-fading channels," *IEEE Trans. Commun.,* vol. 39, pp. 1455–1464, Oct. 1991; Q. Liu and Y. Wan "An adaptive maximum-likelihood sequence estimation receiver with dual diversity combining/selection," *Ind. Symp. on Personal, Indoor and Mobile Radio Commun.,* Boston, Mass., pp. 245–249, Oct. 19–21, 1992, and Q. Liu and Y. Wan, "A unified MLSE detection technique for TDMA digital cellular radio," 43rd IEEE *Vehicular Technology Conference,* Seacaucus, N.J., pp. 265–268, May 18–20, 1993. In the above mentioned research, diversity combining is performed by adding together the magnitude squared prediction errors from different diversity channels when forming metrics.

The use of antenna arrays at base stations in a mobile communication systems has also been proposed as a technique for increasing capacity and performance. The most common approach for processing the information gathered by each antenna associated with a particular signal is based on direction of arrival (DOA) estimation followed by beamforming, i.e. combining the vector signal from the array to a scalar signal (spatial filtering) before detection. However, this approach does not fully exploit the spatial structure of the channel. A better way is to use an algorithm that is adaptive in the spatial domain and which also takes the quality that the transmitted signal has a finite alphabet (e.g., 0's and 1's) into account. Examples of such algorithms are the recently proposed iterative least squares with projections (ILSP) algorithm and the decoupled weighted least squares with projections (DWILSP) algorithm. The decoupled algorithm is similar to ILSP in performance, but is computationally cheaper.

Both ILSP and DWILSP are, in their original formulation, limited to use on frequency-flat (i.e., non time-dispersive) channels. However, in many mobile communication systems, the channel cannot be modelled as frequency-flat. To treat time-dispersive channels, extensions to the iterative least squares approaches have also been presented. These algorithms are unfortunately quite complex, both regarding computational aspects and detection procedures involved.

Another drawback associated with these conventional algorithms is their requirement of precise synchronization. Although the DWILSP algorithm can be used to process signals received from unsynchronized cochannel users, synchronization with the signal of interest is still assumed, i.e., the signal of interest is assumed to be sampled correctly in accordance with the symbol timing. In practice, this assumption may not hold true, since perfect symbol timing is difficult to achieve. For example, in certain types of systems, e.g., time division multiple access (TDMA) systems which use short transmission bursts, proper sample timing is extremely difficult to guarantee. Thus, as will be illustrated in the simulations performed by Applicants and described below, the conventional DWILSP algorithm suffers significant degradation (e.g., increased bit error rate) when timing errors are introduced into the sampled signal.

Several techniques have been proposed which use oversampling, i.e., taking more than one time discrete sample during each symbol interval, to handle the problems associated with unsynchronized signals. The DWILSP algorithm, however, is designed to use only one sample per symbol interval and, therefore, is not amenable to these types of solutions.

Accordingly, it would be desirable to provide a technique for estimating symbols using the DWILSP algorithm from unsynchronized signals sampled at the symbol rate. Moreover, it would also be desirable to use the DWILSP algorithm to obtain improved diversity combining.

SUMMARY

According to exemplary embodiments of the present invention, these and other drawbacks and problems associated with the conventional DWILSP algorithm, and similar techniques for processing received radio signals, are overcome by providing self-synchronizing techniques which provide improved performance for nonsynchronously sampled signals. For example, Applicants have recognized that nonsynchronously sampled signals create additional intersymbol interference (ISI) which should be compensated for in order to improve detection performance. This additional ISI is different than that described above in that it is parameterizable (and therefore readily determinable) based upon timing error and modulation type.

Thus, exemplary embodiments of the present invention teach the provision of compensation schemes which, for example, modify the conventional DWILSP technique to compensate for the ISI introduced by nonsynchronous sampling. A specific example is given for MSK modulation, although the present invention can be applied to any type of modulation with adaptations which will be apparent to those skilled in the art.

In addition to providing self-synchronizing processing techniques, exemplary embodiments of the present invention also provide for robust diversity combining which outperforms conventional techniques, e.g., RAKE diversity combining. By using the DWILSP technique to provide temporal combining of spatio-temporal signal estimates created using an adapted version of the RAKE algorithm, exemplary embodiments of the present invention are able to significantly improve upon prior diversity combining techniques.

BRIEF DESCRIPTION OF THE DRAWINGS

The features and advantages of Applicants' invention will be understood by reading this description in conjunction with the drawings, in which.

DETAILED DESCRIPTION

The following description is scripted in terms of a cellular radiocommunication system, but it will be understood that Applicants' invention is not limited to that environment. To provide an understanding of various exemplary receivers and systems within which structures and techniques according to the present invention can be implemented, the following summarizes an exemplary cellular radiocommunication system.

Figure 1:
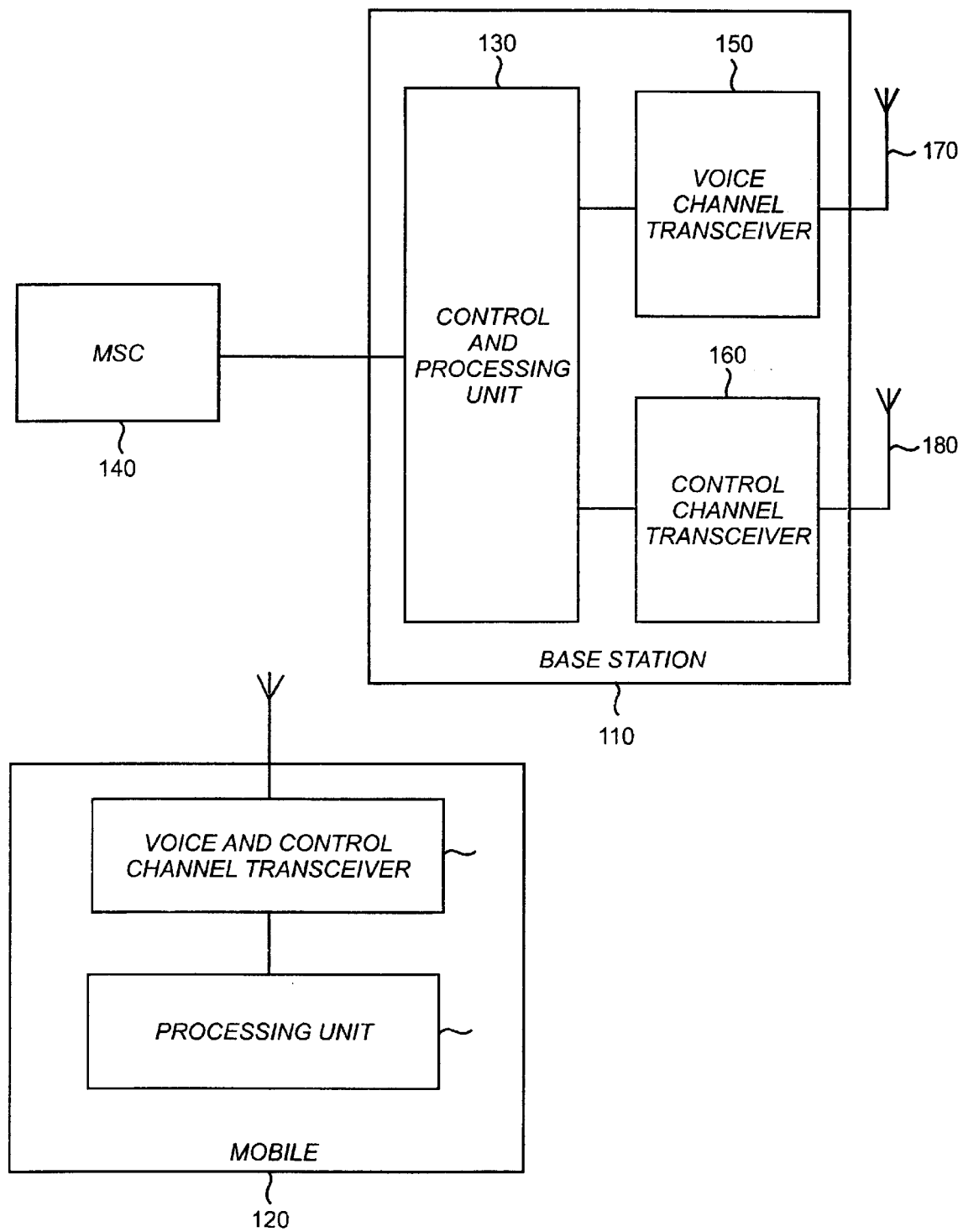
FIG. 1 is a block diagram of an exemplary cellular radio telephone system in which the present invention may be applied.

FIG. 1 is a block diagram of an exemplary cellular radiocommunication system, including an exemplary base station 110 and mobile station 120. The base station includes a control and processing unit 130 which is connected to the mobile switching center (MSC) 140 which in turn is connected to the PSTN (not shown). General aspects of such cellular radiocommunication systems are known in the art, as described by the above-cited U.S. patent applications and by U.S. Pat. No. 5,175,867 to Wejke et al., entitled "Neighbor-Assisted Handoff in a Cellular Communication System," and U.S. patent application Ser. No. 07/967,027 entitled "Multi-Mode Signal Processing," which was filed on Oct. 27, 1992 now U.S. Pat. No. 5,745,523, both of which are incorporated in this application by reference.

The base station 110 handles a plurality of traffic channels through a traffic channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the traffic and control transceiver 170 in the mobile station, for use with control channels and traffic channels that share the same radio carrier frequency. The traffic channels can be used in a dedicated, connection-oriented manner to transmit information, e.g., for a voice connection, where each channel is used continuously for a period of time to support transmission of a single stream of information or in a packet-oriented manner where each channel can be used to send independent units of information associated with different information streams.

Figure 2:
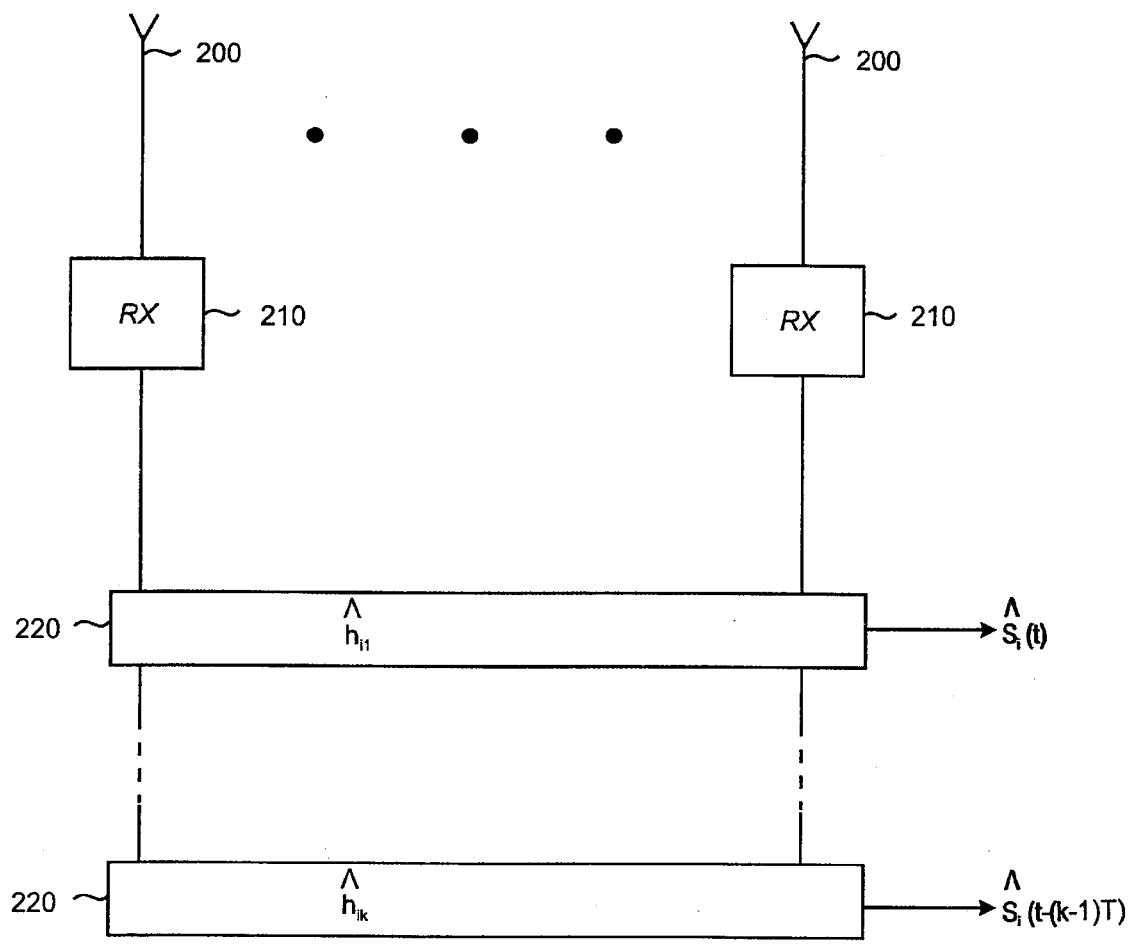
FIG. 2 illustrates an exemplary antenna array and processing structures associated therewith.

Transceivers 150 and 160 may have dedicated antennas 170 and 180 which, using a duplex filter, transmit and receive signals for processing therein. Alternatively, base station 110 may be provided with an antenna array as depicted in FIG. 2. The antenna array will have some number m of antenna elements 200, where m>=2. Each signal creates a response on each antenna element 200, which response is processed (e.g., filtered, downconverted, etc) in receive processing blocks 210. The processed signal responses are used to generate a channel estimate $h_{ik}$ and a signal estimate $s_k(t)$ for each sampling time instance i as shown in blocks 220. The manner in which these estimates are created and combined are described below with respect to exemplary embodiments of the present invention.

In order to have a complete understanding of the present invention, it is first beneficial to consider the origins thereof, in particular the DWILSP technique referred to above. A similar description of this conventional technique can be found in the article entitled "Decoupled Separation of Digitally Modulated Signals Arriving at an Antenna Array", authored by P. Pelin et al., published in Proc. of RVK 96, Lulea, Sweden, June 1996, the disclosure of which is expressly incorporated here by reference.

The Conventional DWILSP Technique

In an environment with multipath propagation, the output of an m-element array can be expressed as:

$$x(t) = \sum_{k=1}^{d} \sum_{l=1}^{q_k} a(\theta_{kl}) \gamma_{kl} p_k s_k(t - \tau_{kl}) + v(t) \quad (1)$$

where d is the number of signals impinging on the array, $s_k$ is the signal from the k:th user (with symbols belonging to a finite alphabet) and $\gamma_{kl}$ and $\tau_{kl}$ is the attenuation and time-delay for each of the $q_k$ subpaths.

Herein, a narrow-band assumption is imposed (i.e., the propagation delays associated with multipath are much smaller than the inverse bandwidth of the signals), so that $s_k(t-\tau_{kl}) \approx \exp(j\omega\tau_{kl})s_k(t)$. Equation (1) can thus be rewritten as:

$$x(t) = \sum_{k=1}^{d} a_k p_k s_k(t) + v(t) \quad (2)$$

where $$a_k = \sum_{l=1}^{q_k} \gamma_{kl} \exp(-j\omega\tau_{kl}) a(\theta_{kl}),$$

called the spatial signature, is the sum of multipath array responses due to signal k. Assuming the d signals are symbol-synchronized, which assumption (as mentioned above) increases the bit error rate associated with the received signal under many practical conditions, the antenna outputs are passed through a filter matched to the transmit pulse, and sampled at the symbol rate R=1/T to yield the corresponding discrete-time model:

$$x(n) = As(n) + v(n) \quad (3)$$

where $A_{m|d}$ is the collection of total array response vectors, scaled by the signal amplitudes, i.e., $A=[p_1 a_1 \ldots p_d a_d]$, $s(n)=[b_1(n) \ldots b_d(n)]^T$, $b_i(n)=\pm 1$, and $v(n)$ is spatially and temporally white noise. A block formulation is obtained by taking N snapshots, yielding:

$$X(N) = AS(N) + V(N) \quad (4)$$

where $X_{m|N}(N)=[x(1) \ldots x(N)]$, $S_{d|N}(N)=[s(1) \ldots s(N)]$, and $V_{m|N}(N)=[v(1) \ldots v(N)]$. The spatial structure of the data is represented by A, while the matrix S represents the temporal structure. The above formulation is valid for BPSK (binary phase shift keying) signals, but extension to arbitrary linear modulation schemes is straightforward.

By defining one signal (at a time) to be signal of interest (SOI), equation (4) can be rewritten in the following way:

$$X(N) = a_1 s_1 \sum_{i=2}^{d} a_i s_i + V(N) \quad (5)$$
$$= a_1 s_1 + J(N)$$

where the first signal is taken to be the SOI, without loss of generality. The term J(N) thus corresponds to interfering signals plus noise. Since it is desired to estimate the signals with little or no spatial knowledge, a and s can be iteratively estimated, based on the formulation in equation (5).

Given an initial estimate of a spatial signature a, the following weighted least-squares criterion function is iteratively minimized:

$$\min_{a,s}(X-as)^*W(X-as) = \min_{a,s}\left\|W^{\frac{1}{2}}(X-as)\right\|^2 \quad (6)$$

Here, W should ideally be chosen as $$R_J^{-1},$$

which can be interpreted as a prewhitening of the data vector x(n). However, it can be shown using the matrix inversion lemma, that using the inverse of the sample estimate of the covariance of the array output produces asymptotically equivalent signal estimates. Equation (6) can thus be reformulated as follows:

$$\min_{b,s}\|Z - bs\|^2 \quad (7)$$

with $Z=\hat{R}_x^{-1/2}X$ and $b=\hat{R}_x^{-1/2}a$. For fixed b, the solution to equation (7) with $$\hat{s} = (\hat{b}^*\hat{b})^{-1}\hat{b}^*Z = \frac{1}{\|\hat{b}\|^2}\hat{b}^*Z \quad (8)$$

Exploiting the finite-alphabet property, this solution is projected onto its closest discrete values in the signal space. In the case of BPSK signals, this projection is equivalent to taking the sign of each component in s. The (modified) spatial signature b is then updated by minimizing equation (7) with respect to b. The solution is:

$$\hat{b} = Z\hat{s}^*(\hat{s}\hat{s}^*)^{-1} = \frac{Z\hat{s}^*}{N} \qquad (9)$$

Note that equation (9) is a temporally matched filter to the current signal estimate, whereas (8) represents a spatially matched filter. The process is repeated until s converges, after which the algorithm continues with the next signal.

As mentioned above, the conventional DWILSP algorithm does not take into consideration that the symbol sampling is imperfect. Accordingly, the present invention modifies the aforedescribed technique to handle intersymbol interference caused either by non bit-synchronized sampling or by the modulation technique used to process the original signal for transmission over the air interface. These modified techniques according to the present invention are referred to herein as "self-synchronized" techniques.

Self-Synchronized Techniques

Sampling a signal in an unsynchronized manner means, for most modulation formats, that intersymbol interference (ISI) is introduced. This form of ISI is quite different from the ISI caused by a time dispersive propagation channel. The reason for this is that ISI caused by unsynchronized sampling has an underlying structure, i.e., the ISI can be parameterized by the timing error.

The parameterization of this structured kind of ISI differs between modulation formats. Therefore, the modifications made to the DWILSP technique according to exemplary embodiments of the present invention will also depend on the modulation format.

The effects of ISI due to nonsynchronous sampling are reflected in the data model by a modification of the source signal description as:

$$x(n) = \sum_{i=1}^{d} h_i s_{ISI,i}(n) + v(n) \qquad (10)$$

Here, the ISI is parameterized in the scalar signal $S_{ISI,i}(n)$, and the characterization of this ISI depends on the modulation format. In some cases, there is no ISI at all, for example MPSK modulation with a rectangular pulse shape, sampled directly at the symbol rate without a preceding matched filter. Nevertheless, in most cases, sampling nonsynchronously leads to ISI, as for example when a signal modulated by minimum shift keying (MSK) is nonsynchronously sampled.

An MSK signal is most often received by direct sampling at the symbol rate, without any matched filter, as in the European GSM system and systems operating in accordance with the GSM standard. Generally, the received signal, nonsynchronously sampled, can be expressed as:

$$s_{ISI}(t) = s(t) \cdot \sin\left(\frac{\pi}{2T_s}\tau\right) - j \cdot s(t-1) \cdot \cos\left(\frac{\pi}{2T_s}\tau\right) \qquad (11)$$

where $T_s$ is the sampling interval and $\tau \in [0,1]$ is the timing error in the sampling (relative to $T_s$). From this equation it can be seen that for an MSK-signal, the signal $s_{SISI}(t)$ is characterized by:

a constant envelope, that is, it has the same power independent of the value for $\tau$;

the ISI-components are separated in quadrature, where:

$$s(t) \cdot \sin\left(\frac{\pi}{2T_s}\tau\right)$$

is the in-phase component, and $$-s(t-1) \cdot \left(\frac{\pi}{2T_s}\tau\right)$$

is the quadrature component.

These qualities make it possible to write the output, x(t), from the m-element array antenna for a flat fading channel or a spatio-temporal diversity path as:

$$x(t) = h \cdot [\alpha_1 - j \cdot \alpha_2] \cdot \begin{bmatrix} s(t) \\ s(t-1) \end{bmatrix} + J \qquad (12)$$

where, $$\alpha_1 = \sin\left(\frac{\pi}{2T_s}\tau\right) \qquad (13)$$

$$\alpha_2 = \cos\left(\frac{\pi}{2T_s}\tau\right) \qquad (14)$$

$x(t) \in C^{m \times 1}$, and $h \in C^{m \times 1}$ describes the propagation channel for a flat fading channel (i.e., without time dispersion) or a spatio-temporal diversity path. Finally, J denotes any modeling error. To provide even better performance, a pre-whitening process can be applied. Pre-whitening is achieved by computing the following new quantities. First, the estimated array covariance matrix is defined by (with "H" denoting the Hermitean transpose operator):

$$\hat{R}_{xx} = \sum_{t=1}^{N} x(t)x^H(t) \qquad (15)$$

and then the pre-whitened array output data and channel response vector as, resp., $$z(t) = \hat{R}_{xx}^{-1/2} \cdot x(t) \qquad (16)$$

and, $$g = \hat{R}_{xx}^{-1/2} \cdot h \qquad (17)$$

Figure 3:
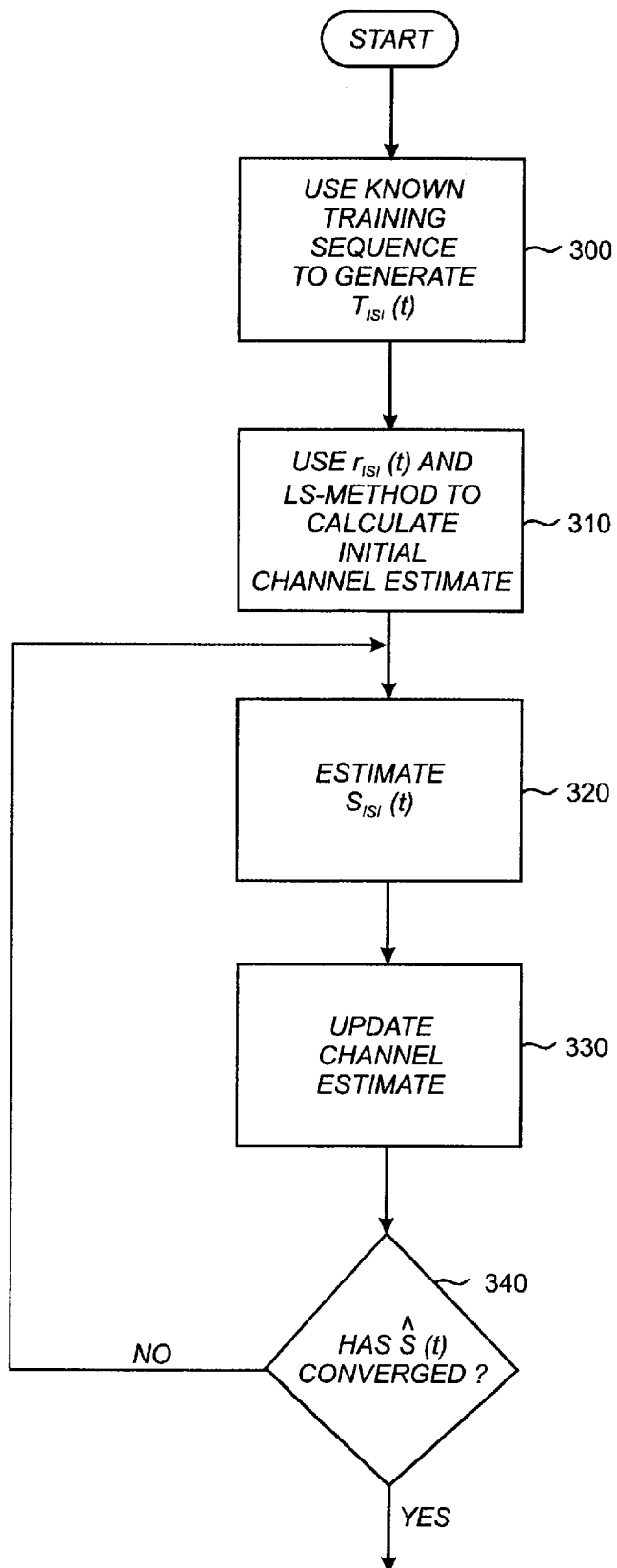
FIG. 3 is a flowchart depicting an exemplary self-synchronizing technique according to the present invention.

The self-synchronizing technique according to the present invention for detecting/estimating ISI in a single diversity path can now be outlined as follows. The flowchart of FIG. 3 provides a visual guide to the below described steps according to the present invention.

Assume, at block 300, an initial timing error, e.g., $\tau$=0.5, and create a corresponding signal $r_{ISI}(t)$, using a known training/reference sequence r(t) (which is contained as a part of the original finite alphabet signal, s(t), transmitted from a mobile station). Those skilled in the art will appreciate that different systems provide different known reference sequences in their transmission bursts. For example, the GSM system provides a training sequence having 26 bits.

To continue for the general case, generate, for $t=t_1$ up to $t=t_2$, the construction denoted $r_{ISI}(t)$:

$$r_{ISI}(t) = r(t) - j \cdot r(t-1) \qquad (18)$$

the length of this construction will depend on the actual length of the particular training sequence considered. Use this construction, together with the well-known Least-Squares (LS) method for parameter estimation, to find an initial estimate, $\hat{g}$, of the channel response vector at block 310 using the below data model (with $t=t_1 \ldots t_2$):

$$z(t)=g \cdot r_{ISI}(t) \quad (19)$$

Having found an initial estimate, the process continues iteratively beginning with an estimation of the sampled ISI signal, $\hat{s}_{ISI}(t)$, employing the LS-method using the received pre-whitened data, $z(t)$, and the estimated channel response vector, $\hat{g}$, as indicated at block 320. Next, the model for the estimated received data can be rewritten as:

$$\begin{bmatrix} \text{Re}(\hat{s}_{ISI}(t)) \\ -\text{Im}(\hat{s}_{ISI}(t+1)) \end{bmatrix} \approx \begin{bmatrix} \alpha_1 \\ \alpha_2 \end{bmatrix} \cdot s(t) \quad (20)$$

where $s(t)$ is the originally transmitted finite alphabet signal by a mobile station. In equation (20), the variables $\alpha_1$, $\alpha_2$ and $\hat{s}(t)$ can then be solved for using the conventional DWILSP technique. The relative sampling instance, $\tau$, can be estimated from $\alpha_1$ and $\alpha_2$.

The next step is to compute an updated estimate of the sampled ISI signal according to: $\bar{s}_{ISI}=\hat{\alpha}_1 \cdot \hat{s}(t) - j \cdot \hat{\alpha}_2 \cdot \hat{s}(t-1)$ Then an updated channel response vector, $\hat{g}$, can be computed, block 330, using the LS-method on the data model:

$$z(t)=g \cdot \bar{s}_{ISI}(t) \quad (21)$$

If $\hat{s}(t)$ has converged as determined at block 340, then the process can be terminated, otherwise another iteration begins at step 320.

Other linear modulation formats, e.g., BPSK, lead to models similar to the one presented above for MSK. Note, however, that the ISI parameter vector may or may not be a linear function of timing error $\tau_i$ for these other models.

To test the performance of processing techniques according to the present invention, a simulation was conducted that compares the present invention with the conventional DWILSP algorithm for signals using BPSK or Gaussian MSK modulation. The test simulated a 5-element antenna array that receives two signals from nominal DOA:s of [−15°,20°]. The signals are transmitted in bursts corresponding to the normal GSM burst, i.e., 148 bits, including a 26 bit training sequence in the central part, and three known tail bits at each end. The channel was modelled as flat-fading and the scattering cluster width $\sigma$ was 3°. To simulate Rayleigh fading, independent channel vectors were used for each transmitted burst. The average $E_b/N_o$ at each antenna-element was set to 5dB.

In the BPSK case, the performance of the original DWILSP algorithm was compared to the self synchronizing technique according to the present invention. In the simulation, the self-synchronizing technique was tested twice, once using the LS-approach, and a second time using Viterbi equalization to facilitate a performance comparison. The timing error introduced by nonsynchronous sampling was varied, giving the results shown in FIG. 4. In this figure, bit error rate is plotted against timing error. Throughout these simulations the following conventions are used. The dashed line represents the results for the conventional DWILSP technique, the results for the self- synchronizing technique (LS-approach) is shown as a dotted line and the results for the self-synchronizing technique (Viterbi approach) is shown using a solid line.

Figure 4:
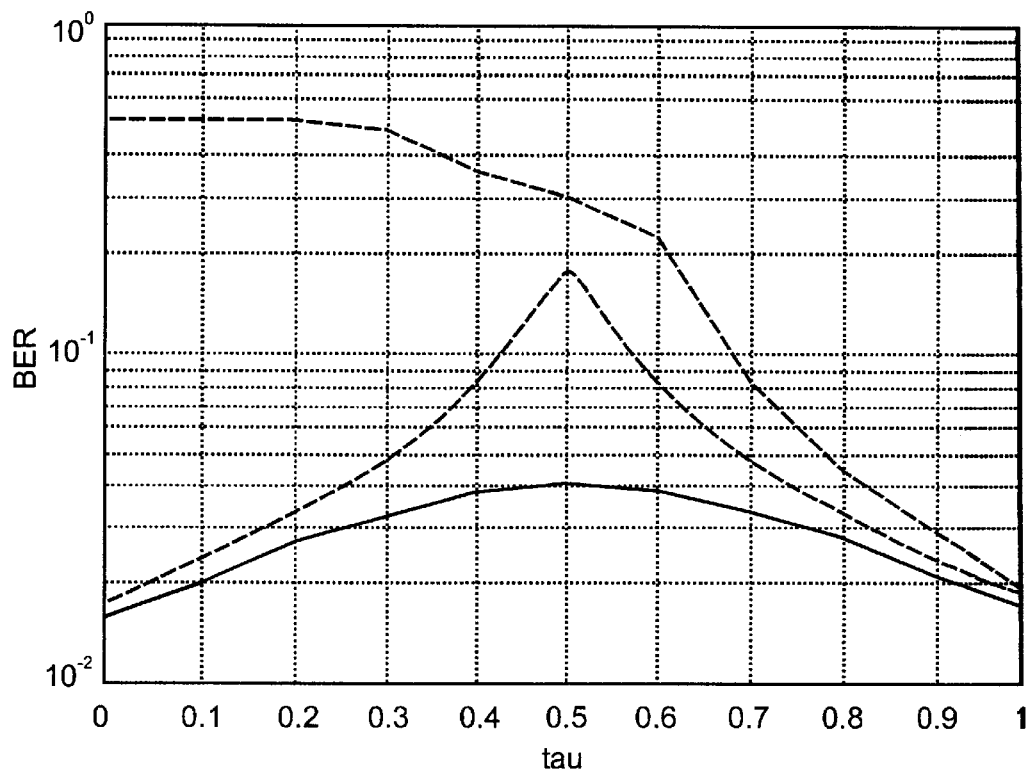
FIG. 4 is a graph illustrating simulation results in terms of bit error rate for BPSK modulated signals processed according to both the conventional DWILSP technique and self-synchronizing techniques according to the present invention.
Figure 5:
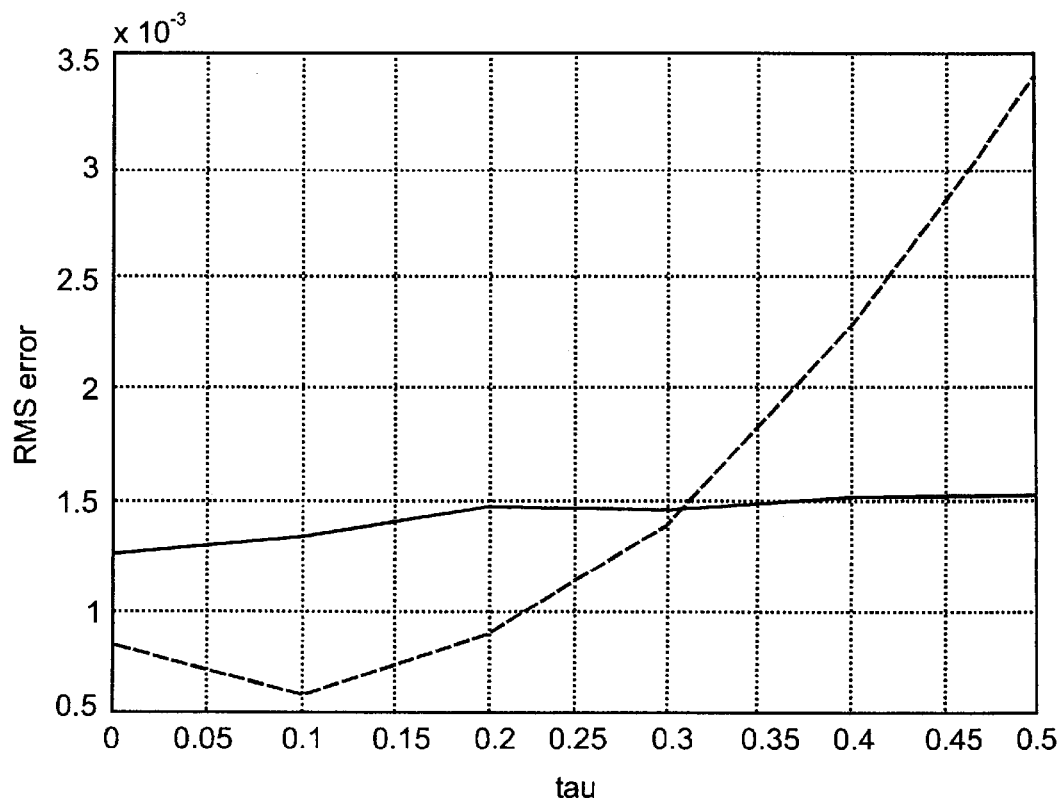
FIG. 5 is a graph illustrating simulation results in terms of root mean square delay for BPSK modulated signals processed according to self-synchronizing techniques according to the present invention.

In FIG. 4, it can be seen that either implementation of the present invention provides improved performance as compared with the conventional DWILSP technique due to its assumption of synchronized bit sampling. The numerical problems involved in the LS implementation for timing errors in the vicinity of $\tau=0.5$ can be seen by the spike in the BER. Using the Viterbi algorithm also leads to a performance degradation for $\tau \neq 0$ and $\tau \neq 1$, but this is a consequence of the signal power loss involved, and not the Viterbi algorithm itself. In some signal processing applications, for example radar and positioning, the timing error $\tau$ is of more importance than the BER. FIG. 5 shows the root mean square (RMS) error of the delay estimate for the LS and Viterbi implementations of the present invention.

Figure 6:
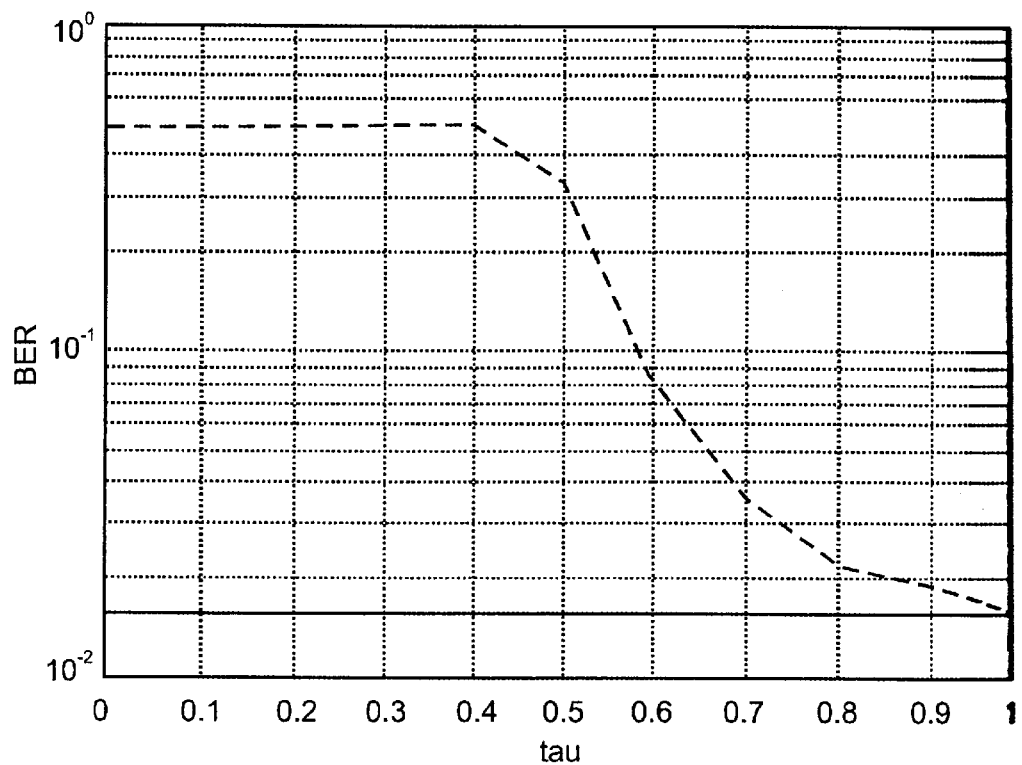
FIG. 6 is a graph illustrating simulation results for MSK modulated signals processed according to both the conventional DWILSP technique and a self-synchronizing technique according to the present invention.
Figure 7:
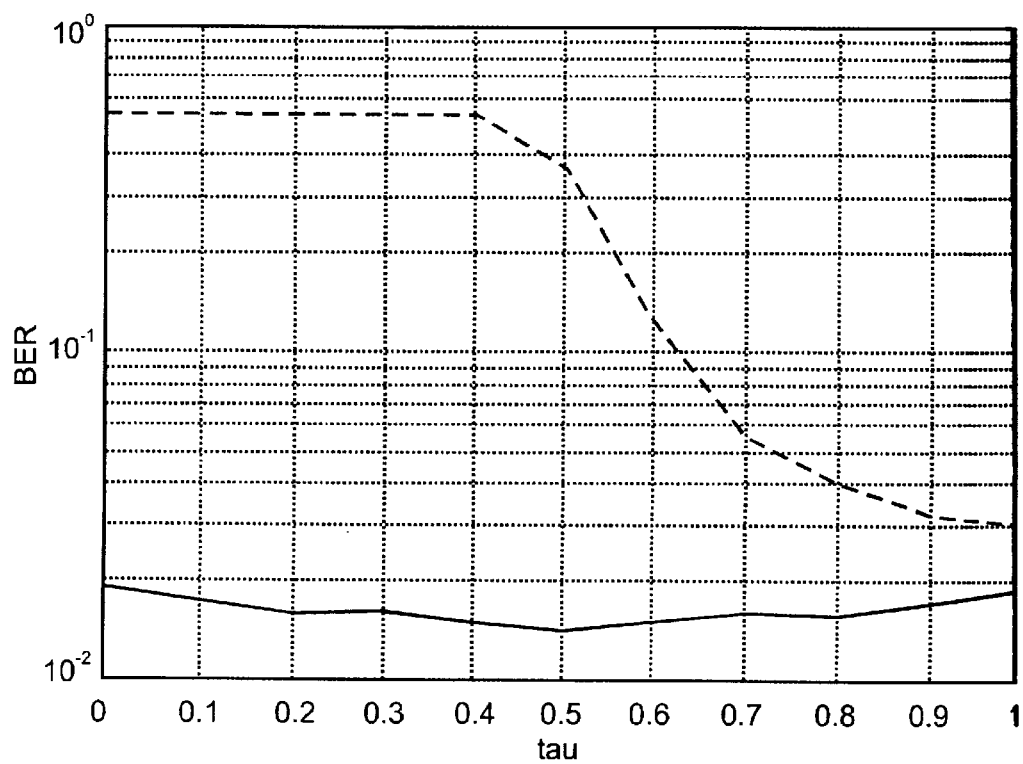
FIG. 7 is a graph illustrating simulation results for GMSK modulated signals processed according to both the conventional DWILSP technique and a self-synchronizing technique according to the present invention.

Repeating the simulation described above but with MSK and GMSK modulation for the transmitted signals provides the results shown in FIGS. 6 and 7, respectively. For both types of modulation, the present invention again outperforms the DWILSP technique. For the GMSK case, it can be seen that the performance of the self-synchronizing technique according to the present invention is only slightly dependent on the timing. The best performance is obtained by sampling the received signal between symbol transitions, i.e. $\tau=0.5$, since the GMSK waveform is much closer to MSK at these instants.

As can be seen from the foregoing, the conventional DWILSP algorithm required the signal of interest to be sampled correctly or the BER performance will be degraded. By way of contrast, exemplary techniques according to the present invention provides improved performance across the spectrum of timing errors and, accordingly, permit the signal of interest to be sampled nonsynchronously. For some modulation formats, some performance degradation is introduced, whereas for others, there is no performance degradation involved.

The self-synchronizing techniques according to the present invention also provide an estimate of the timing error, either explicitly, or as a function value thereof. For example, Equation (13) can be rewritten to provide an estimate of the timing error $\tau$ as the following function value:

$$\hat{\tau} = \frac{2 \cdot T_s}{\pi} \cdot \arcsin(\hat{\alpha}_1)$$

where $T_s$ is here a known quantity, and $\hat{\alpha}_1$ has been estimated by the conventional DWILSP algorithm. As a consequence, the self-synchronizing version of the DWILSP algorithm can be used for other applications than communications, for example radar and positioning.

Diversity Combining

The foregoing exemplary embodiments dealt with ISI caused by modulation and/or unsynchronized sampling. This type of ISI is deterministic since there is a strict underlying parameterization. The following exemplary embodiments relate to ISI caused by the propagation channel which, as described above, is quite different in nature. In the same way that the mobile radio channel spreads the transmitted energy in the spatial domain, i.e., in a stochastic manner, the time-dispersion of the channel also causes a spreading of energy in the temporal domain.

Cancelling the effect of the channel dispersion is, as described above, a classical problem known as equalization. Conventional techniques include different filtering approaches, such as the linear equalizer (a filter approximating the inverse of the channel) and the decision feedback equalizer (DFE). These can be extended to the array signal case. Another often employed algorithm is the maximum likelihood sequence estimator (MLSE). The latter is often regarded as being optimal, as it is derived from the maximum likelihood principle.

As described above, the conventional DWILSP algorithm acts as a spatial diversity combiner, collecting the spatially spread energy in an efficient way. Thus, it would be desirable in the case of a channel spreading the transmitted energy both in space and time, to design an algorithm that performs diversity combining jointly over space and time. Such algorithms have been proposed but are unfortunately quite complex, both with regard to computational aspects and detection procedures involved. Also, these conventional approaches require an oversampling of the received signal. However, based on the well-known RAKE-approach, a space-time algorithm according to the present invention can be derived with the DWILSP algorithm as its elementary building block.

Regarding the source signals as temporally white, the time dispersive case can be reformulated according to the frequency flat data model. The DWILSP algorithm can then be adopted to estimate different time-arrivals separately. This step thus performs spatial combing. Then, the different time-arrival estimates are combined temporally. This technique according to the present invention thus constitutes a RAKE-combiner, exploiting both the spatial and temporal structure of the measured array signal, as well as the finite alphabet property of the modulated source signal. Moreover, this novel technique provides high performance at a low computational complexity, while at the same time lending itself to a simple and straightforward implementation.

The approach taken here is based on estimation of different time arrivals of the desired user signal separately, instead of trying to invert or equalize the filter representing the channel. A fmal estimate is achieved by a combination of the estimates of the different time arrivals.

To provide a foundation for understanding diversity combining according to the present invention, traditional RAKE techniques are first described. The RAKE combiner was originally proposed for direct sequence spread spectrum (DSSS) systems operating on time-dispersive channels. Consider the data model for a frequency selective channel:

$$x(n) = \sum_{k=0}^{L} h_k s(n - kT_c) + n(n) \qquad (22)$$

where s is a DSSS signal. A significant property of DSSS signals is that they are wideband signals. The wideband property is achieved by spreading the original data sequence with a high rate spreading code, whose elements are called chips, each with a duration of $T_c$ seconds. Each original data symbol thus contains several chips, and the spreading code is designed to have an autocorrelation function resembling white noise, such that symbols shifted more than one chip length apart are approximately uncorrelated. This type of signal is commonly used, for example, in radiocommunication systems that operate in accordance with code division multiple access (CDMA) techniques.

Figure 8:
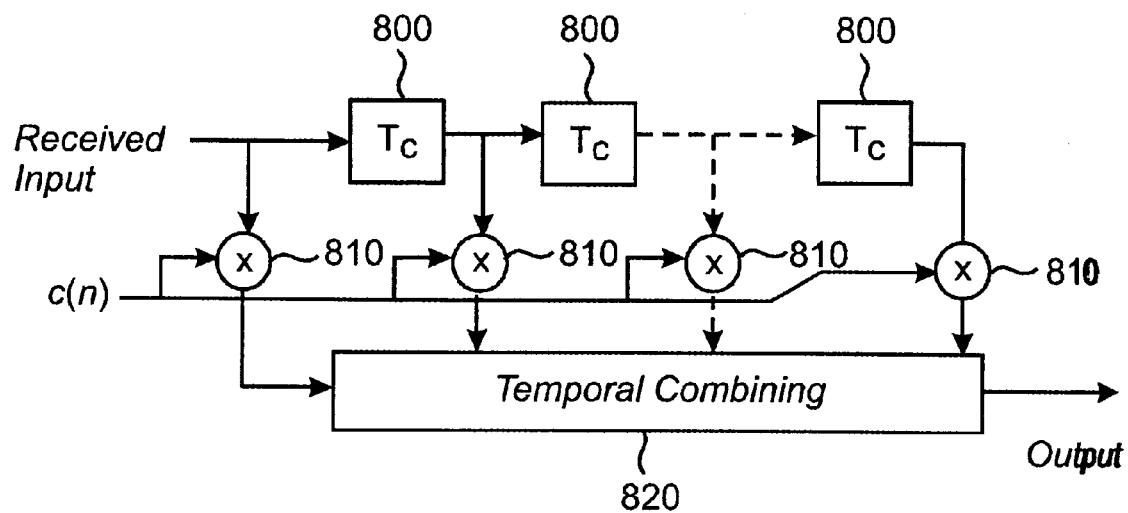
FIG. 8 is a block diagram of a conventional RAKE combiner.

The DSSS RAKE combiner estimates each time-arrival $s(n-kT_c)$ by exploiting the autocorrelation property of the spreading sequence. The L+1 signal estimates are then temporally combined to yield a finite signal estimate. The total scheme is thus equivalent to an L+1 order diversity combiner (if the channel taps $h_k$ are uncorrelated). The conventional RAKE combiner can be illustrated as in FIG. 8, where each block 800 provides a time delay $T_c$ and the multiplication by c(n) at each multiplier 810 represents the despreading operation. The temporal branches seen in FIG. 8 are often referred to as "RAKE fingers" but are referred to herein as "spatio-temporal signal estimates" when used to refer to branches of a modified RAKE combiner wherein the DWILSP algorithm is used to provide for spatial combination. The outputs of each RAKE finger are then temporally combined at block 820 by a diversity combining technique as will be described below.

Now consider the array signal model for the single user, frequency selective case:

$$x(n) = \sum_{k=0}^{L} h_k s(n - kT_s) + n(n) \qquad (23)$$

The RAKE approach can also be applied to the array (unspread) signal case. Instead of spread symbols, as in the DSSS data model of equation (22), consider blocks of symbols. If the user signal is sufficiently temporally white, shifted versions, by an amount of $T_s$ seconds or more, become approximately uncorrelated. A block of symbols thus acts as the spreading sequence in the DSSS case, and different time-arrivals can be viewed as different user signals in the frequency flat case. Then the DWILSP type algorithm can be used to estimate the different time arrivals separately.

The RAKE approach can be generalized to the multi-user case. Considering the different time arrivals as different signals, the double sum in the multi-user model can be rewritten according to equation (22), corresponding to the frequency flat case with d(L+1) users:

$$x(n) = \sum_{i,k} h_{ik} s_{ik}(n) + v(n) \qquad (24)$$

Figure 9:
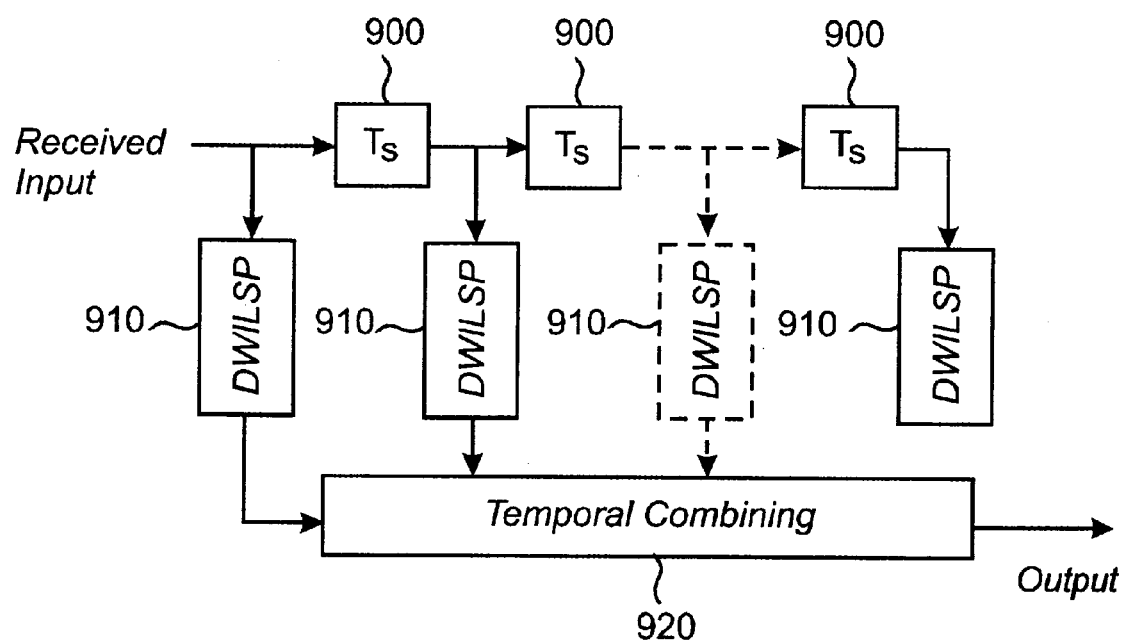
FIG. 9 is a block diagram of another known RAKE combiner using the DWILSP technique to provide signal estimates.

Thus, the RAKE combiner for the array signal case is shown in FIG. 9, where delayed versions of the received symbols are provided by blocks 900. The despreading operation in FIG. 8 is replaced by the conventional DWILSP algorithm in blocks 910 which provide spatio-temporal signal estimates to the temporal combining block 920.

Applying the conventional DWILSP algorithm to estimate time arrival k in the model of equation (23), it is seen that with a known temporally white user signal, the estimate of $h_k$ is still consistent. However, the filter tap correlations introduce an ISI term into the signal estimate in a manner similar to that described above.

Figure 10:
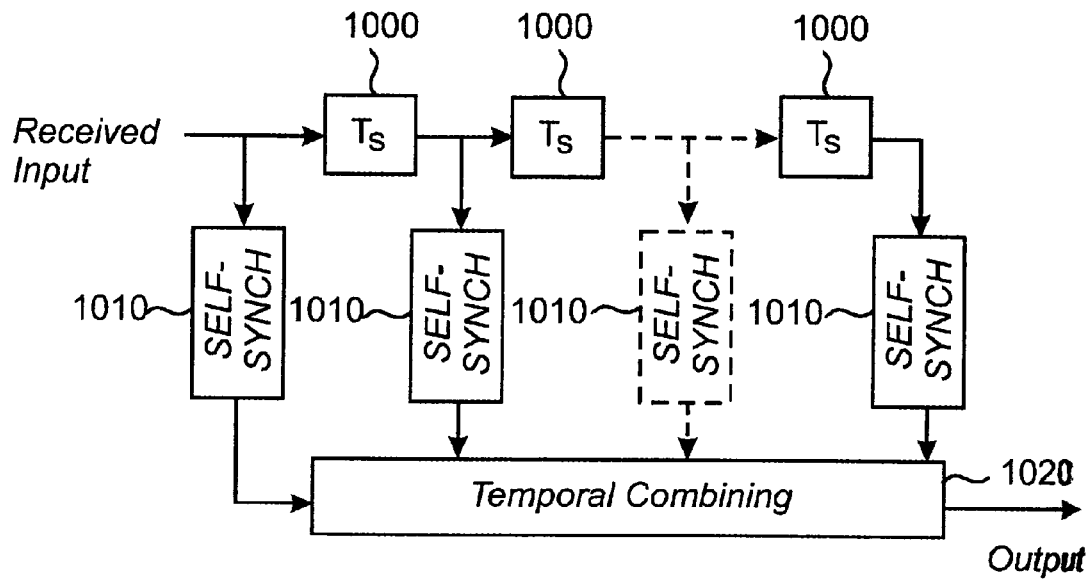
FIG. 10 is a block diagram of a RAKE combiner according to an exemplary embodiment of the present invention.

To overcome this problem associated with prior RAKE combiner efforts, i.e., to mitigate the effect of filter tap correlation, the self-synchronizing techniques described in the above exemplary embodiments can be applied to provide the spatio-temporal signal estimates as shown in FIG. 10. Therein, the delay blocks 1000, spatio-temporal signal estimators 1010 and temporal combining logic 1020 operate as described above.

In the case of DSSS, maximum ratio combining (MRC) is often employed as the temporal combining technique employed in block 820 of FIG. 10. MRC maximizes the output signal-to-noise ratio (SNR), given independent noise in each finger and uncorrelated filter taps. The combined signal estimate is given as:

$$\bar{s}(n) = \sum_{k=0}^{L} \frac{h_k^*}{\sigma_k^2} \hat{s}_k(n) \qquad (25)$$

where $\hat{s}_k(n)$ is the output of the k:th finger, $h_k^*$ the conjugate of the corresponding filter tap, and $\sigma_k^2$ is the finger noise variance.

Modified Maximum Ratio Combining

As described in the above incorporated by reference article entitled "Decoupled Separation of Digitally Modulated Signals Arriving at an Antenna Array", the conventional MRC approach can be modified with the conventional DWILSP algorithm. For example, before projection onto the finite symbol alphabet, the k:th estimate of the i:th user signal after the final iteration can be expressed as:

$$\hat{s}_{ik}(n) = \alpha_{ik} s_{ik}(n) + \beta_{ik}(n) \tag{26}$$

where $\alpha_{ik}$ represents a small bias (usually negligible), and $\beta_{ik}(n)$ is a noise term due to scaled thermal noise v(n) plus cochannel and self interferences $s_{ji}(n)$, (j≠i) OR (l≠k). This noise term can, with good accuracy, be considered as temporally white Gaussian and the noise in different signal estimates are approximately uncorrelated, i.e. $E[\beta_{jl}\beta_{ik}]=0$, for (j≠i) OR (l≠k).

Ignoring the bias $\alpha$, each signal estimate of $s_i(n)$ is automatically normalized in amplitude (PSK: |s(n)|=1) by DWILSP. Furthermore, as the noise terms $\beta(n)$ are uncorrelated between branches, one way of combining the estimates would be to use MRC at equation (25) as shown below:

$$\tilde{s}_i(n) = Proj\left(\sum_{k=0}^{L} \frac{1}{\sigma_{ik}^2} \hat{s}_{ik}(n)\right) \tag{27}$$

In equation (27), the operator (Proj) means projection onto the finite alphabet and $\sigma^2_{ik}$ is the variance of $\beta_{ik}(n)$, which can be estimated as $Var(Proj(\hat{s}_{ik})-\hat{s}_{ik})$. For BPSK modulation, DWILSP projects symbols onto the alphabet of +/−1 and only the variance of the real part of the noise should be considered.

However, when DWILSP fails completely at estimating a time-arrival of a signal, for example when a tap $h_k$ in equation is weak or doesn't exist, the false signal estimate is still normalized in amplitude, resulting in noise saturation effects, i.e. the variance $\sigma^2$ of $\beta(n)$ reaches a limit. To suppress bad estimates/fingers, simulations have indicated that a better weighting than ordinary MRC is:

$$\tilde{s}_i(n) = Proj\left(\sum_{k=0}^{L} \frac{1}{\sigma_{ik}^4} \hat{s}_{ik}(n)\right) \tag{28}$$

Note that the value of the exponent (i.e., 4) in equation (28) is not critical. Any value in the range 3–6 results in approximately the same bit error rate (BER).

Temporal Combining Using DWILSP

Figure 11:
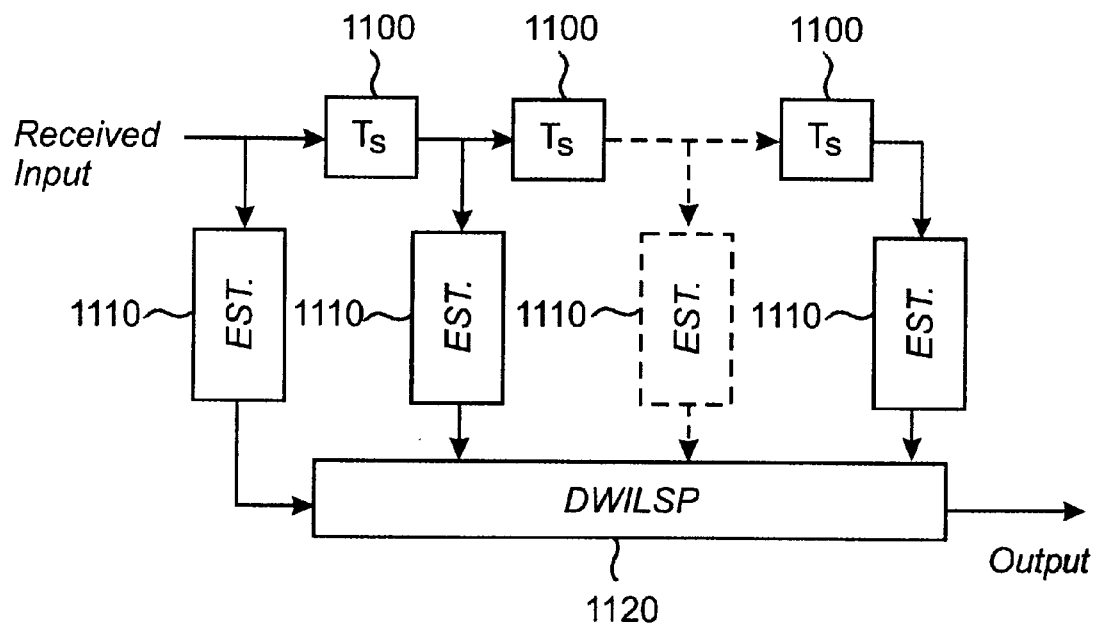
FIG. 11 is a block diagram of a RAKE combiner according to an another exemplary embodiment of the present invention.

Although the DWILSP algorithm was originally intended for applications with antenna arrays, Applicants have recognized that this technique is also a general diversity combiner. Consequently, the conventional DWILSP technique can also be used for the temporal combining function depicted in blocks 820, 920 and 1020 of FIGS. 8–10, respectively. These exemplary embodiments of the present invention are illustrated in FIG. 11, wherein blocks 1100 provide delayed samples, blocks 1110, which are labelled simply as estimators to reflect a generic inclusion of traditional RAKE fingers, conventional DWILSP spatio-temporal estimators or usage of the self-synchronizing techniques according to the present invention, provide signal estimates and block 1120 shows the DWILSP technique functioning as the temporal combiner. Used in this way, stacking the L+1 (soft) estimates $\hat{s}_{ki}$ of user signal i, a matrix equation is obtained as:

$$\begin{bmatrix} \hat{s}_{oi} \\ \hat{s}_{1i} \\ \ldots \\ \hat{s}_{Li} \end{bmatrix} = ws + Q \tag{29}$$

where the left hand side of the matrix corresponds to the measured array signal X, s is the true signal and Q is a noise term. The column vector w can be interpreted as a temporal channel vector, representing the delay profile of the channel. The column vector w also has a direct correspondence to the combining weights $h_k^*/\sigma_k^2$ in MRC, or $1/\sigma_k^4$ in the modified scheme, as solving equation (29) using DWILSP is essentially a search for the best diversity combining weights. Note that with the DWILSP algorithm employed for temporal combining, as well as to provide the spatio-temporal signal estimates, the finite alphabet property is used twice.

There are several benefits associated with using the DWILSP technique for temporal combining in a RAKE receiver. For example, DWILSP is very robust in cases where not all diversity channels contain the signal of interest. Also, there is no specific assumption made regarding noise color, and the amount of fading correlation. Regardless of the temporal combining scheme applied, however, tracking of the combining weights for blocks/bursts of data, is desirable as it provides valuable information about time variations of the effective channel length. Also, this information is useful for frame synchronization in TDMA systems.

Figure 12:
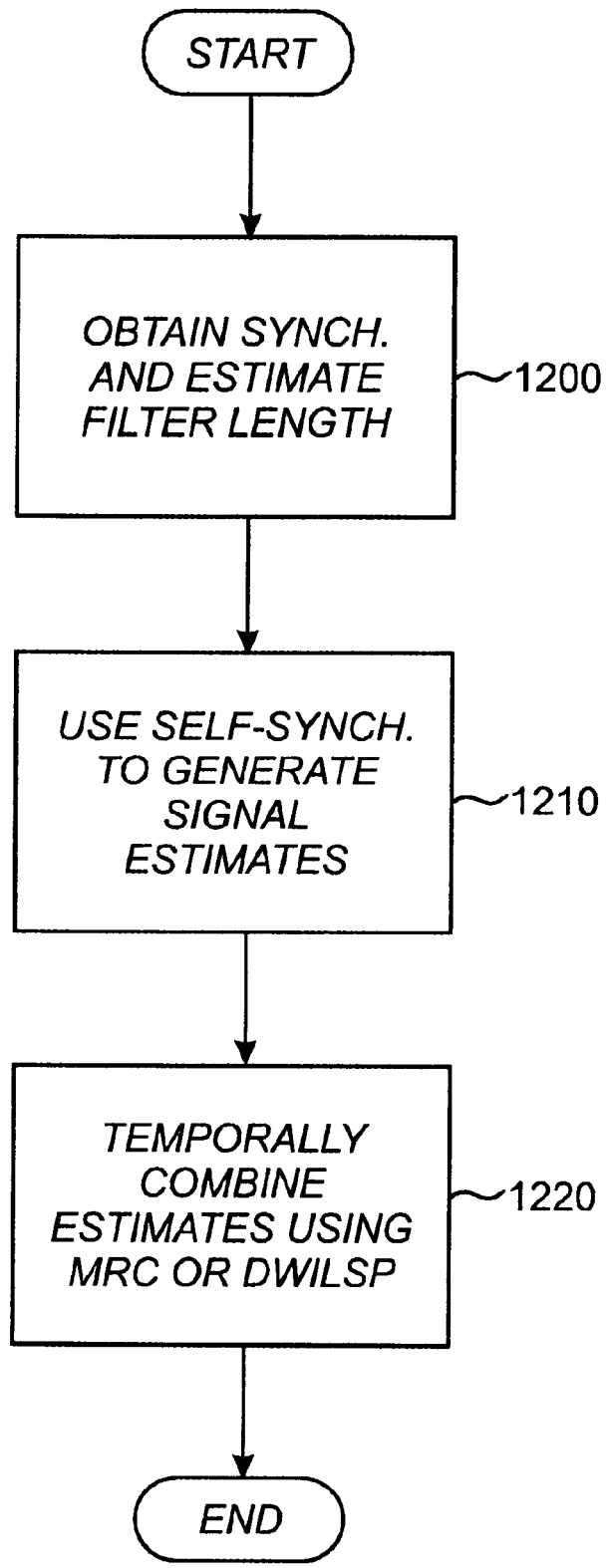
FIG. 12 is a flowchart illustrating steps associated with an exemplary diversity combining technique according to the present invention.

To summarize the novel diversity combining techniques according to the present invention, an exemplary series of steps is illustrated by way of the flowchart of FIG. 12. First, at block 1200, the known training sequence (e.g., the CDVCC in D-AMPS) is used to obtain synchronization, and estimate the filter length L. Then, initialized with the training sequence, the self-synchronizing technique described above can be used to obtain a signal estimate $\hat{s}_{ik}$ of time path k at block 1210. Next, the signal estimates can be temporally combined at block 1220, by either (1) estimating the variance of $\beta_{ik}(t)$ and using modified MRC according to equation (28) or using the conventional DWILSP to perform temporal combining.

The performance of RAKE receivers according to the present invention was evaluated numerically at two different settings of a 5-tap FIR channel. The local scatter model was used to model each filter tap. The filter taps were modelled as statistically independent, therefore and the standard version of the DWILSP algorithm was used to provide the spatio-temporal signal estimates.

In the simulations, the receiving antenna was chosen to be a 10-element uniform linear array (ULA). Three equally powered cochannel users were placed at nominal DOA:s [30°, 0°, −45°], relative to the array broadside. BPSK data was transmitted in bursts of 150 bits. Each burst included a 15-bit m-sequence, periodically extended to 19 bits, which was used as a training sequence for initialization of the receiver algorithm.

As a comparison, the performance of the conventional MLSE technique was also evaluated. The MLSE was run twice: once with the exact channel and interference covariance matrix as a benchmark, and also using maximum likelihood estimates of these parameters obtained from the training sequence to provide a more realistic evaluation of MLSE performance. The MLSE was implemented with the Viterbi algorithm.

Figure 13:
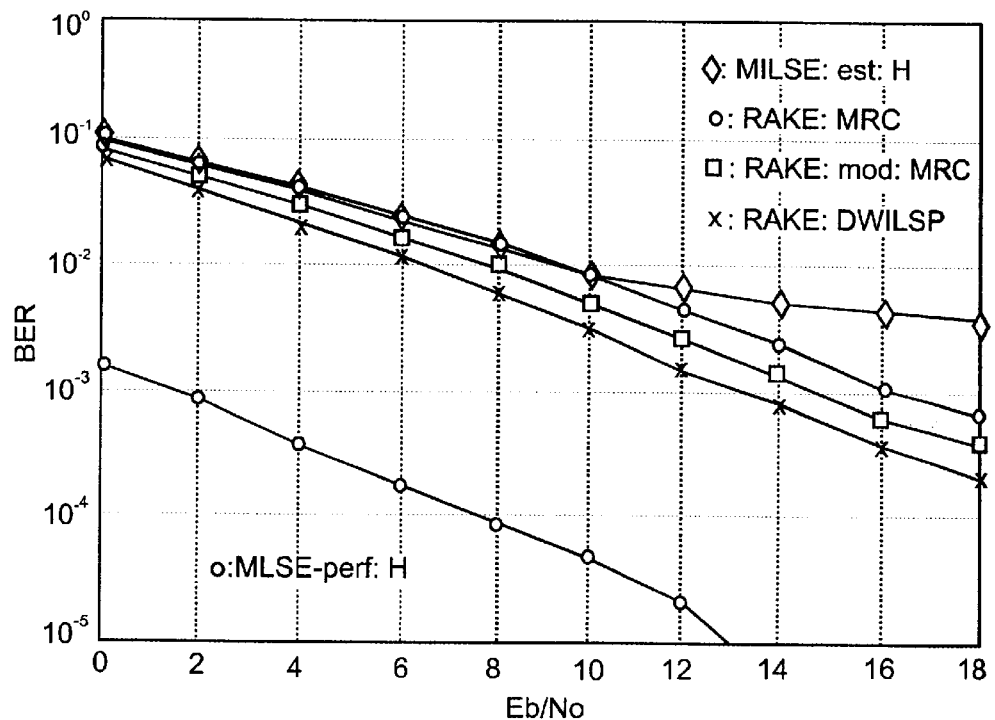
FIG. 13 is a graph illustrating the results of a first simulation used to demonstrate the performance of an exemplary diversity combining technique associated with the present invention.

In the first simulation, the relative average power in each tap was the same. Assuming a larger angular spread for the late arrivals (but the same nominal DOA), the cluster width standard deviations for the different taps were [2°, 3°, 4°, 5°, 6°]. The total signal power is here defined as the sum of the powers in each filter tap. The resulting BER for the user at 0=0° as a function of the element $E_b/N_o$ is shown in FIG. 13.

Therein, starting from top right, the first curve shows the performance of the MLSE run with estimated channel parameters and interference covariance, and it is seen that this method has a performance that is limited by the cochannel interference. This characteristic is not seen in the other curves. The second curve shows the performance of the RAKE-combiner using standard MRC temporal combining. Moving to the third curve from the top right, it is seen that performance has been improved by about 2dB using modified MRC. Another 2dB is gained by employing DWILSP combining. The last curve shows the performance of the MLSE run with the exact parameters. Considering the fact that the MLSE is run with estimated parameters in a practical application, e.g. the first curve, the RAKE-combiner using DWILSP as the temporal combining yields very good performance.

Figure 14:
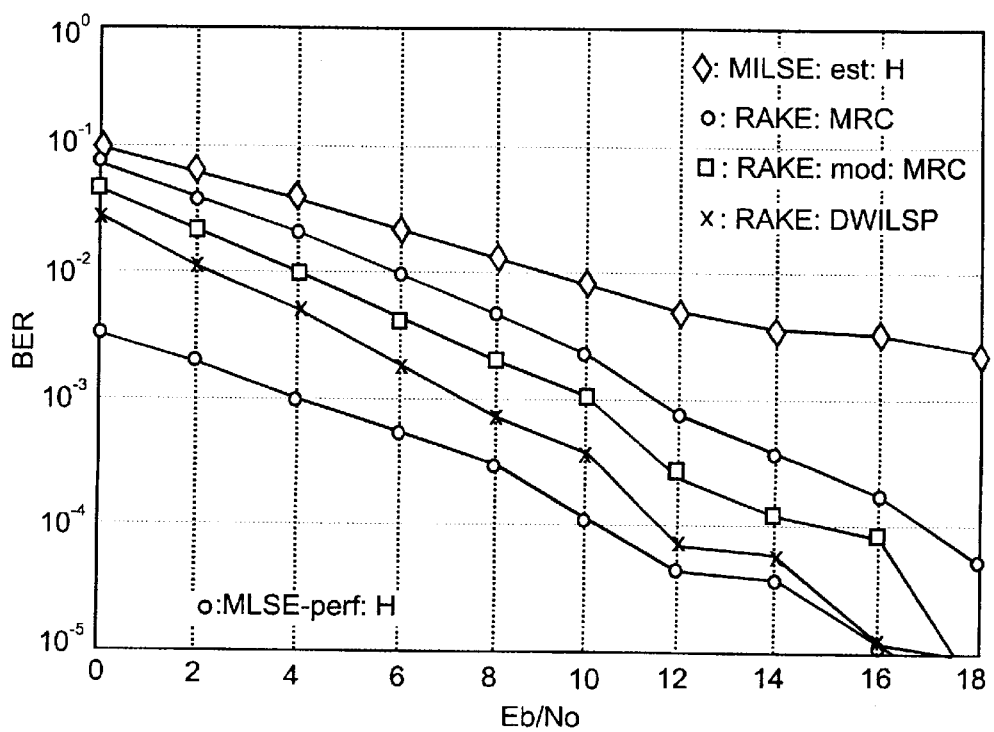
FIG. 14 is a graph illustrating the results of a second simulation used to demonstrate the performance of an exemplary diversity combining technique associated with the present invention.

In the second simulation, FIG. 14, the channel setting was adjusted to simulate a hilly terrain environment. The mean filter tap powers were set as [0, 0, −20, −20, −6] dB and the cluster width standard deviations were [2°, 3°, 6°, 2°]. Each tap corresponded to a direction of [0°, 1°, 0°, 0°, 10°] relative to the nominal DOA's, i.e., the late arrival impinging from a somewhat different direction compared to the early ones. The relative performance of the different algorithms resemble the results from FIG. 13. But this time, with an easier channel setting, the difference in performance between the DWILSP-RAKE and MLSE using estimated parameters is larger. In fact, the DWILSP-RAKE comes close to the MLSE run with the exact parameters at high signal-to-noise ratios.

It is, of course, possible to embody the invention in specific forms other than those described above without departing from the spirit of the invention. The embodiments described above are merely illustrative and should not be considered restrictive in any way. The scope of the invention is determined by the following claims, rather than the preceding description, and all variations and equivalents which fall within the scope of the claims are intended to be embraced therein.

What is claimed is:

1. A method for processing a signal received in a radio-communication system comprising the steps of:
   (a) sampling said received signal, whereby intersymbol interference is introduced into said received signal; (b) generating at least one channel estimate and an associated signal sample estimate associated with said received signal;
   (c) estimating said introduced intersymbol interference;
   (d) updating said at least one channel estimate and said associated signal sample estimate associated with said received signal using said estimated introduced intersymbol interference;
   (e) repeating steps (b), (c) and (d) for a predetermined number of iterations; and
   (f) outputting said channel estimate and an associated signal sample estimate.

2. The method of claim 1, wherein said step of sampling further comprises the step of:
   nonsynchronously sampling said received signal.

3. The method of claim 1, wherein said step of repeating further comprises:
   performing, as said predetermined number of iterations, iterations until a value associated with said signal sample estimate converges.

4. The method of claim 1 wherein said at least one channel estimate is generated using a decoupled weighted iterative least squares with projections (DWILSP) algorithm.

5. The method of claim 1, wherein said step of estimating further comprises the step of:
   estimating said introduced intersymbol interference based on a type of modulation used to modulate said received signal.

6. A system for processing a radio signal comprising:
   means for sampling said radio signal, whereby intersymbol interference is introduced into said received signal;
   means for generating at least one channel estimate and an associated signal sample estimate associated with said received signal;
   means for estimating said introduced intersymbol interference;
   means for updating said at least one channel estimate and said associated signal sample estimate associated with said received signal using said estimated introduced intersymbol interference;
   means for iteratively applying said means for estimating and said means for updating for a predetermined number of iterations; and
   means for outputting said at least one channel estimate and said associated signal sample estimate.

7. The system of claim 6, wherein said means for sampling further comprises:
   means for nonsynchronously sampling said radio signal.

8. The method of claim 6, wherein said step of repeating further comprises:
   performing, as said predetermined number of iterations, iterations until a value associated with said signal sample estimate converges.

9. The method of claim 6 wherein said at least one channel estimate is generated using a decoupled weighted iterative least squares with projections (DWILSP) algorithm.

10. The system of claim 6, wherein said means for estimating further comprises:
    means for estimating said introduced intersymbol interference based on a type of modulation used to modulate said received signal.

* * * * *